No. 785,759. PATENTED MAR. 28, 1905.
A. J. O'NEIL & F. L. WRENN.
METAL TIRED CAR WHEEL.
APPLICATION FILED SEPT. 24, 1904.
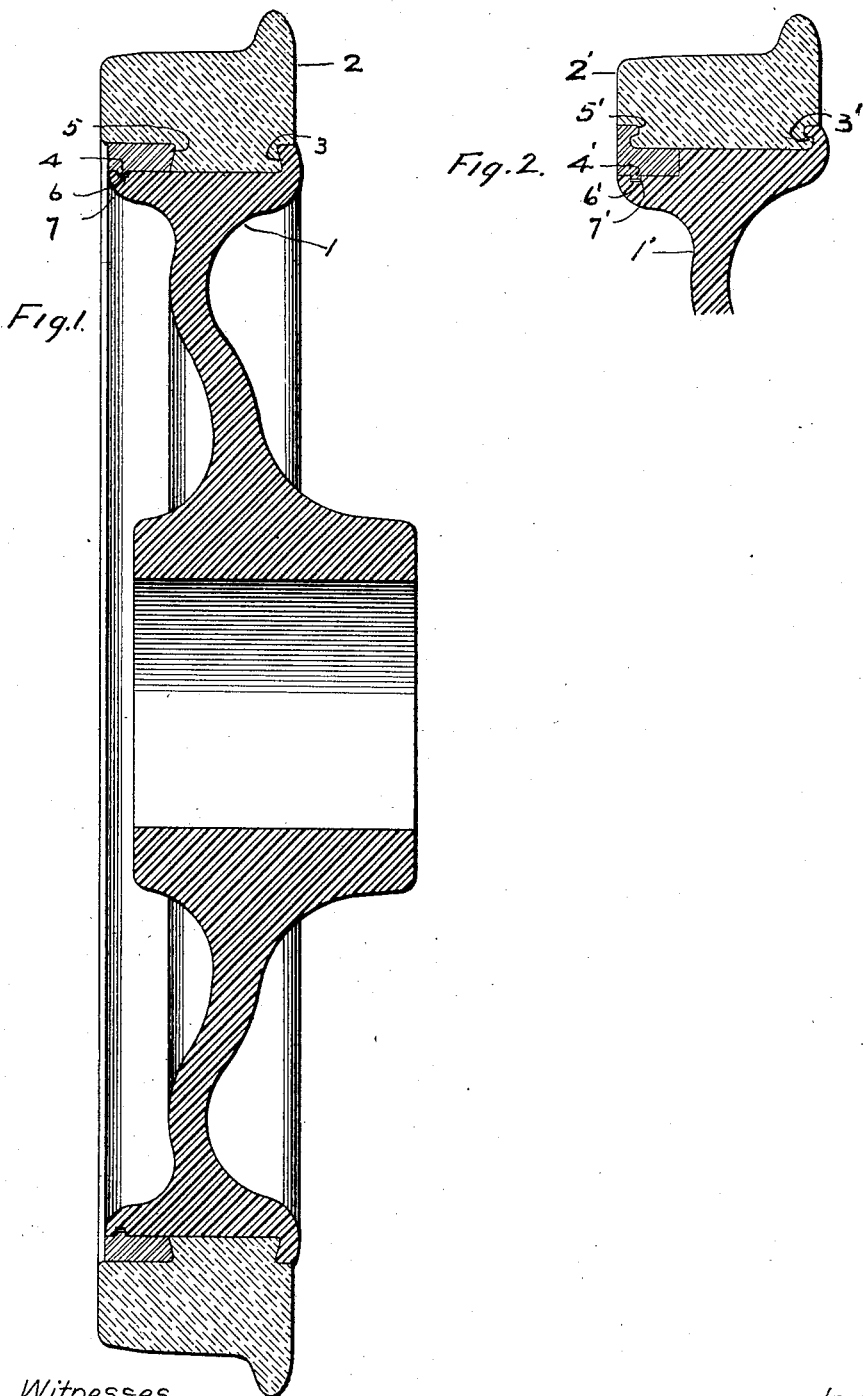

No. 785,759.

Patented March 28, 1905.

UNITED STATES PATENT OFFICE.

ADAM J. O'NEIL AND FRANK L. WRENN, OF SCRANTON, PENNSYLVANIA.

METAL-TIRED CAR-WHEEL.

SPECIFICATION forming part of Letters Patent No. 785,759, dated March 28, 1905.

Application filed September 24, 1904. Serial No. 225,863.

*To all whom it may concern:*

Be it known that we, ADAM J. O'NEIL and FRANK L. WRENN, citizens of the United States, and residents of Scranton, in the county of Lackawanna and State of Pennsylvania, have invented a new and useful Metal-Tired Car-Wheel, of which the following is a specification.

Our invention relates to improvements in a car-wheel having a separate tire fastened thereon by means of metal rings shrunk on the center of wheel and engaging with tire; and the objects of our improvements are to fasten tire to center in such a manner as to make the center and tire practically integral. In case tire becomes broken in one or more parts the parts are still retained in position on wheel center. In case of renewals tires can be easily taken off wheel center and replaced with another tire, permitting use of old center and replacing worn-out or defective tires with new or sound ones. We attain these objects by the method as shown by the accompanying drawings.

Figure 1 is a cross-section of the wheel as assembled. Fig. 2 is a part section of wheel center and tire, showing another form of lips from that of Fig. 1.

Similar numbers and marks refer to similar parts.

1 1' is a wheel center, to which is shrunk and fastened tire 2 2'. Tire 2 2' is forced close to lip 3 3' on wheel center 1 1'. Lip 3 has its inside face formed with angle and prevents tire being forced off.

4 is a metal ring having the face next to tire formed at angle similar to that at 3, which forms a dovetail and grips tire closely to center. 4' is likewise same as that, 3', and performs same service.

6 6' is an annular projection on the inside diameter of ring 4 4', which fits closely to the annular space 7 7' on the outside diameter of wheel center 1 1' and prevents tire or ring being backed off center.

When the wheel is to be assembled, the tire 2 and ring 4 are expanded together, say, by heat, and dropped over center 1 1' close to lip 3 3', and the annular projection 6 6', fitting close to the annular space 7 7', when the ring shrinks into place holds ring 4 4' securely in place, and the dovetail formed by ring 4 and lip 3 securely holds tire 2 in place even when the tire is broken in several parts.

The form may be varied, as shown in Figs. 1 and 2, as by using two retaining-rings instead of solid lip and one ring, without deviating from the principle involved.

What we claim as our invention, and desire to secure by Letters Patent, is—

1. In a wheel having a metal center with a metal tire, means for fastening said tire to said center consisting of a dovetail projection on one side on center and a shrunk ring having a dovetail face fitting closely to the other side.

2. In a wheel having a metal center with a metal tire, means for fastening said tire to said center consisting of a dovetail projection on the one side of center and a shrunk ring having a dovetail face fitting closely to the other side and an annular projection on the inside surface of said tire fitting closely to an annular space on the outside surface of the said center.

3. In a wheel having a metal center with a metal tire, means for fastening said tire to said center consisting of shrunk rings on either side of said center and tire with their inside faces forming a dovetail which grips said tire and secures the same in place.

4. In a wheel having a metal center with a metal tire, means for fastening said tire to said center consisting of shrunk rings on either side of said center with their inside faces forming a dovetail which grips a corresponding projection on said tire and secures the same in place and annular projections on the inside surface of said rings fitting closely to corresponding spaces on the outside surface of said center.

In testimony whereof we have affixed our signatures in the presence of two witnesses.

ADAM J. O'NEIL.
FRANK L. WRENN.

Witnesses:
  JOS. A. MURPHY,
  CHAS. W. DAWSON.